(12) United States Patent
Franke et al.

(10) Patent No.: US 6,208,944 B1
(45) Date of Patent: Mar. 27, 2001

(54) METHOD FOR DETERMINING AND DISPLAYING SPECTRA FOR VIBRATION SIGNALS

(75) Inventors: Dieter Franke, Ismaning; Johann Loesl, Vaterstetten; Steffen Buehler, Unterfoehring, all of (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 09/105,303

(22) Filed: Jun. 26, 1998

(30) Foreign Application Priority Data

Jun. 26, 1997 (DE) ............................................... 197 27 114

(51) Int. Cl.[7] ............................. G06F 19/00; G01R 23/00
(52) U.S. Cl. ......................... 702/56; 702/76; 702/189; 73/659; 73/660; 340/680; 340/683
(58) Field of Search .................................. 702/56, 75–77, 702/189–190, 191; 73/659, 660; 340/680, 683

(56) References Cited

U.S. PATENT DOCUMENTS

| | | | |
|---|---|---|---|
| 4,426,641 | * 1/1984 | Kurihara et al. | 702/56 |
| 4,429,578 | * 2/1984 | Darrel et al. | 73/660 |
| 4,520,674 | * 6/1985 | Canada et al. | 702/56 |
| 4,980,844 | * 12/1990 | Demjanenko et al. | 702/56 |
| 5,633,811 | * 5/1997 | Canada et al. | 702/56 |
| 5,691,924 | * 11/1997 | Czyzewski et al. | 702/77 |

OTHER PUBLICATIONS

Machinery Analysis and Monitoring, Instrumentation for Recording and Analysis, John S. Mitchell (2nd Ed., Pennwell Publishing Co., Tulsa, OK, ISBN 0–87814–401–3, 1993), Chapter Six, pp. 107–110.

* cited by examiner

Primary Examiner—Marc S. Hoff
Assistant Examiner—Bryan Bui
(74) Attorney, Agent, or Firm—Nixon Peabody LLP; David S. Safran

(57) ABSTRACT

A portable electronic vibration measurement device, detects a large number of structure-borne sound signals using a predetermined sequence of a plurality of specific individual measurements each plurality of measurements taken at a different sampling frequency.

30 Claims, 3 Drawing Sheets

METHOD FOR DETERMINING AND DISPLAYING SPECTRA FOR VIBRATION SIGNALS

BACKGROUND OF THE INVENTION

1. Field of the Invention

The invention relates to a method for determining and displaying spectra for vibration signals. In particular, the invention relates to a method for determining and displaying spectra for structure-borne sound signals which are emitted by machines with rotating or oscillating components, in which a plurality of measurement signals are detected successively in time, individually or as a data set, by means of data acquisition means, in particular in the form of portable data gatherers, signal analyzers or permanently installed continuous monitoring devices, at at least one measurement point by means of a vibration sensor on a machine, and are fed to an evaluation unit in a vibration measurement device or in an evaluation station, and are subjected by means of the evaluation unit to frequency transformation, specifically to a discrete Fourier transformation with a constant absolute narrowband bandwidth, and in which case the results of such a transformation are ordered on the basis of individual frequencies and are reproduced on the basis of magnitude, phase or complex-value results.

2. Description of Related Art

A method of the type to which the present invention is directed is known from the book *Machinery Analysis and Monitoring* by John S. Mitchell (second edition, Pennwell Publishing Company, Tulsa, Okla., ISBN 0-87814-401-3, 1993). Pages 107 to 110 in this book describe the advantages resulting from the use of data gathering devices (so-called data gatherers) when they are used to detect structure-borne sound measurement variables. Such structure-borne sound emissions are produced, in particular, by rotation, and thus, vibrating machines or machine parts. The monitoring of vibration states of such machines is made considerably more economic and more efficient overall by the use of suitable signal diagnostic devices. This is particularly true if the data gatherers can be combined with a superordinate data evaluation station (for example, in the form of a personal computer). This provides good capabilities for also measuring a relatively large number of machines and their machine parts periodically in one cycle of a measurement round (possibly lasting several hours), and thus, allows their status to be monitored continuously, and if necessary, to be analyzed in more detail when significant changes occur. In this process, detected measurement variables and signals are, first of all, buffer-stored in a data gatherer. The multiplicity of detected measurement variables are then transmitted to a memory in the superordinate data evaluation station, and can then be combined, displayed and evaluated in a relatively convenient manner by means of associated software.

Overall, such a procedure has the object of preventing damage to machines, or at least of identifying such damage at an early stage. In this context, it may be sufficient to carry out a check of machine vibration, for example, with respect to level magnitude and characteristics of the bearing noise or rotor vibration, in cycles of only once a week or once a month.

In the meantime, portable data acquisition devices (so-called FFT data gatherers) are able to buffer-store a considerable number of individual readings and measurement signals. This has thus made it possible to carry out the checking of machine vibration by means of high-resolution time signal investigation and spectral analyses. For example, to this end, a data set of about 10,000 to 20,000 individual samples of the vibration signal is, first of all, buffer-stored for an individual machine check and, in a second step, is subjected to so-called Fourier transformation. The result of the Fourier transformation can then be displayed on a screen or a visual display unit, in a manner known per se.

Currently, a plurality of signals, each with different measurement settings, are measured successively at one measurement point corresponding to a component to be diagnosed, in order to produce the overall state investigation. To do this, the vibration signal for a component to be investigated individually must be analyzed with the correspondingly required frequency resolution in the frequency band in which the component vibration occurs. It is well known that lower-frequency vibration occurs as the size of the various components and assemblies increases, which vibration is measured, at relatively low frequencies, as an oscillation rate or as an oscillation displacement, in order to achieve a good signal dynamic response and a good signal-to-noise ratio. The frequency resolution required for the individual narrowband lines becomes finer for relatively low frequencies, in order to make it possible to distinguish between the individual vibration components. For example, the measurement settings for vibration signals from large, slow rotors must be designed such that the oscillation displacement in a frequency band from 2 to 400 Hz is analyzed with a resolution of about 0.1 Hz, that is to say 3200 lines. The vibration signals from small components, such as roller bearings, in contrast, are analyzed with sufficient accuracy using an oscillation acceleration in a frequency band of from 1 kHz to 40 kHz with 3200 lines, each with a resolution of 12.5 Hz. If attempts are now made, for simplicity, to analyze only one vibration signal for all components, up to a high frequency, then the resolution is insufficient for the rotors, even with far greater numbers of lines.

In order to detect the frequency spectra of vibration signals, oscillation acceleration sensors are fitted, in a known manner, at a chosen measurement position, and these oscillation acceleration sensors supply the vibration signal, which is amplified in the measurement device and is filtered by hardware, in the frequency domain. This is followed by A/D conversion of the signal with sampling at a sampling frequency which, as is known, must be about twice the highest cut-off frequency to be investigated in the frequency spectra in order to allow the digital time signal to be used to calculate a frequency spectrum correctly, by means of an FFT or other transformation. A correspondingly large number of samples must be provided in order to obtain the required frequency resolution of the individual narrowband lines in the frequency band. Frequency bands with a constant absolute bandwidth are used for machine vibration signals.

A portion of an illustrated frequency band can be formed, for an advantageous display, from the measured frequency band now obtained. If it is intended to investigate a large number of machines at a plurality of measurement points in one measurement cycle or over a long period of time more than once, then an appropriately large amount of memory must be provided. It is self-evident that a larger memory results, in a disadvantageous manner, in a larger physical volume and increases the cost of a signal diagnostic device. So-called analyzers are used in a similar manner to data gatherers, no periodic monitoring being carried out in this case, but a more far-reaching cause analysis being carried out, only if required, if the vibration states change. On machines which are, for example, very important or to which access is difficult, the task of the data gatherer can also be carried out in the same manner by a permanently installed monitoring device, with continuous monitoring. However, measurement variables or signals are then detected continuously and, if required, are processed further, finally stored, evaluated and visualized, as required, via a relatively long data line, which is likewise permanently installed, at the evaluation station. The FFT data gatherers, analyzers and permanently installed monitoring devices are also referred to as signal diagnostic devices in the following text.

SUMMARY OF THE INVENTION

Accordingly, one object of the invention is to provide a data gatherer, analyzer or monitoring device which can be used for spectral analysis of machine vibration with a resolution which is as high as possible in some places, corresponding to the information content of the signals, and on the other hand, manages with a minimum amount of required memory space for the buffer storage of measurement data, and does not require any digital filters with a digital signal processor.

This object is achieved, according to the invention, by a method in which the following steps are carried out, in combination: In a first step, a number of vibration signals are detected and stored by means of individual samples or samples gathered in a parallel manner as a data set, in which case these vibration signals are recorded at a first sampling frequency, so that an associated, required resolution is achieved for the broadest band frequency band to be investigated.

In a second step, a second number of vibration signals are detected, processed and stored by means of individual samples or samples gathered in a parallel manner as a data set, in which case these vibration signals are, however, recorded at a second sampling frequency which is preferably an integer fraction of the first sampling frequency and is sufficiently different to the first sampling frequency that an associated, required resolution is achieved for a lower frequency band to be investigated.

In one or more further steps, a number of vibration signals are, in each case, once again detected, processed and stored by means of individual samples or samples gathered in a parallel manner as a data set, these vibration signals also being recorded, however, at a further sampling frequency which is preferably an integer fraction of the second sampling frequency and is sufficiently different to the second sampling frequency that an associated, required resolution is achieved for a lowest frequency band, or lower frequency band, to be investigated. These steps may also be carried out in a different sequence, but must be carried out in the same manner, staggered with respect to one another.

In a final further step sequence which is offset in time as required, the stored measurement signals are analyzed and combined so that the result of the analysis can be displayed selectively or in full via a visual display unit or printer. The important factor, in this case, is that all of the indicated steps are carried out immediately after one another or in a predefined sequence, in order that the various vibration phenomena and their causes can be correlated.

This method is carried out, for example, by using an associated device in accordance with the invention, specifically, in the form of a signal diagnostic device. The method and device offer the advantage that structure-borne sound investigations on machines and machine parts can be carried out in various frequency bands of interest with optimum resolution, and in places, with a higher or very high resolution, while the complexity and space requirement for a memory which is necessary, in particular a buffer store, is considerably reduced in comparison to known solutions.

Other advantageous refinements of the invention are specified as follows: The method specified above avoids problems in the interpretation of the measurement results since the frequencies of the determined partial or individual spectra are displayed in a rectangular coordinate system, the abscissa of the coordinate system being split into a plurality of individual sections with an identical, in particular linear, or possibly also logarithmic, scale, and the individual sections having different scale end values, and in each case, optimum frequency resolutions. The ordinates of each individual section, in this case, respectively, represent spectral intensities which are derived from respective associated measurement signals that originate from a predefined, band-limited frequency band, also governed by an upper sampling frequency, or which can be associated with such a frequency band.

Furthermore, the method of the invention is advantageously designed such that the frequency bands for a plurality of spectral bands to be displayed are arranged in such a manner and staggered on the basis of size such that a plurality of individual spectra can be displayed superimposed. To this end, it is advantageous for it to be possible to store, transmit and display the spectral information content in a collated and combined form for the plurality of frequency bands.

It is advantageous if, according to the inventive method, overlapping spectral bands can be masked out or omitted, and are thus, not displayed more than once on a visual display unit, or printed out as a so-called hard copy, and the amount of data in a common data set can thus also be reduced.

In a preferred refinement of the method of the invention, a predetermined number of samples are determined by means of a single measurement command, which contains measurement settings or measurement parameters defined in advance, in order that the individual spectra can be calculated, and furthermore, can be displayed combined jointly via a single display command, which contains display settings defined in advance. To this end, in a step to be carried out in advance, an associated upper cut-off frequency and resolution are advantageously preset, both for a very high frequency individual spectral area and for a mid-frequency individual spectral area, by means of a keyboard or by means of a cursor function on a graphic interface.

Furthermore, according to the invention, a spectral overall display preferably comprises the evaluation results for three individual spectral bands, the upper cut-off frequencies of the spectral bands are in the ratio 1:10:100, and they preferably cover the frequency bands 0 to 400 Hz, 400 Hz to 4000 Hz and 4000 Hz to 40,000 Hz, which respectively allows a frequency resolution improved by a factor of 10 for the same number of lines per band.

With regard to the sampling of the measurement signals, in order to calculate individual Fourier-transformed spectra, the method of the invention can provide a strictly successive procedure, or produce the required measurement signals for, in each case, one associated frequency band, at least virtually at the same time. According to the invention, this procedure can also be repeated a number of times successively, so that it is possible to calculate a plurality of Fourier-transformed spectra (or sets of spectra) with the same bandwidth, and to combine this plurality of spectra in an averaged spectrum and then store these spectra, so that evaluation is possible based on the mean values, deviations and other statistical characteristics. Depending on the type of averaging, signal components of interest can be emphasized in this way. In this context, it is also possible, according to the invention, for the chronological sequence of sampling of vibration signals to be detected on one channel or more than one channel to be carried out in accordance with a predetermined pattern in order to calculate and display individual Fourier-transformed spectral parts, such a pattern dictating a sequence or a probability distribution of parts of the frequency bands which are to be measured directly one after the other. These patterns can, in this case, be selected or freely determined in a preceding step by an operator of an apparatus which is operating according to the method of the invention.

The method according to the invention can be designed with particular advantage such that only spectral bands with sufficiently high signal intensities or sufficiently high signal-to-noise ratios are passed to the display, and if necessary, the amplitude values are converted for this purpose. These spectral or frequency bands are calculated in an automatic manner, and are displayed by means of scaling that is carried out automatically.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
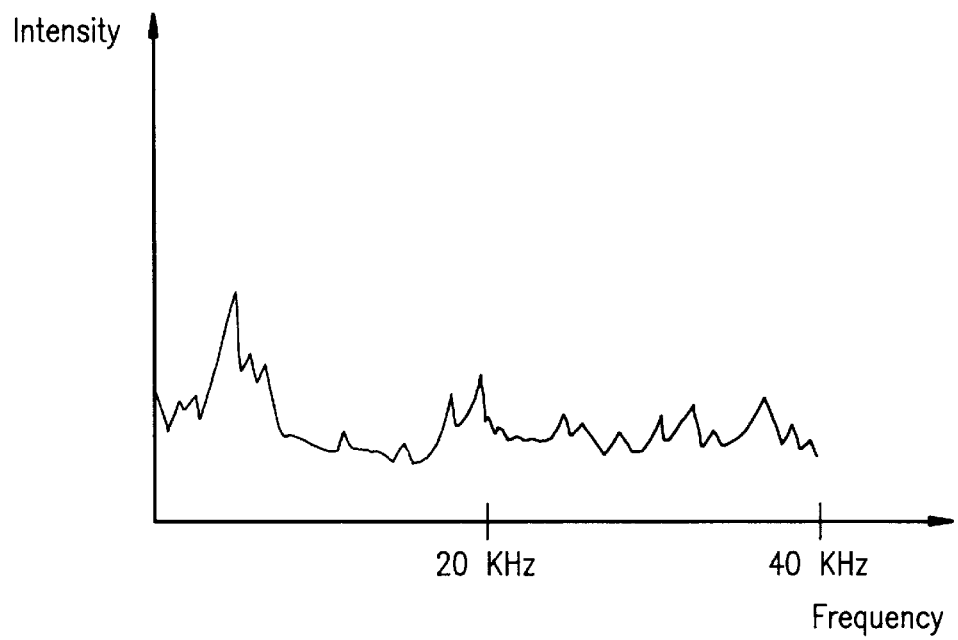
FIG. 1 is a graph depicting a structure-borne sound spectrum, illustrating a frequency band from 0 to 40 kHz, according to the prior art.

The illustration shown in FIG. 1 relates to the fact that a frequency band from about 0 to 40,000 Hz should be covered in order to analyze vibration states such as those which preferably occur in machines while they are operating. In general, higher frequencies have to be analyzed only in the event of specific questions and investigations. In order to produce a frequency vs. intensity plot of the type shown in FIG. 1, a multiplicity of individual acceleration signals are detected in a manner known per se using a sensor which reacts to accelerations, first of all, successively and in an ordered chronological sequence. To this end, an acceleration sensor is fitted in a manner known per se to a suitable point on the surface of a machine to be checked (such as a motor, pump, turbine, machine tool at the bearing point, or a corresponding subcomponent such as a gearbox), and this sensor converts the mechanical acceleration signals into an electrical signal. Such a signal is then converted into individual samples by means of an analog/digital converter ("sampled"). A plurality of individual measurement signals (samples) which have been detected one after the other chronologically are thus provided for each measurement process. These measurement signals are buffer-stored for further evaluation at a later time. (In the case of special measurement methods, so-called multi-channel measured value detection may also be used, instead of this so-called single-channel measured value detection as described. In the case of multi-channel measured value detection, two or more measurement signals are detected, converted and buffer-stored in a signal diagnostic device at virtually the same times—instead of an individual measurement signal in each case.) Using mathematical methods which are known per se, the spectral components of such structure-borne sound emissions are calculated in a subsequent step, by means of an FFT algorithm in an evaluation unit. They are then expediently displayed on its visual display unit using a Cartesian coordinate system with the ordinate and abscissa scaled linearly or logarithmically.

Depending on the operating requirements, the described measured value detection is repeated by means of mobile data acquisition using data gatherers cyclically, for example, once a month or twice a year. The measurement is carried out as required or, in the case of permanent installations, continuously, by an analyzer or a permanently installed monitoring device.

Figure 2A:
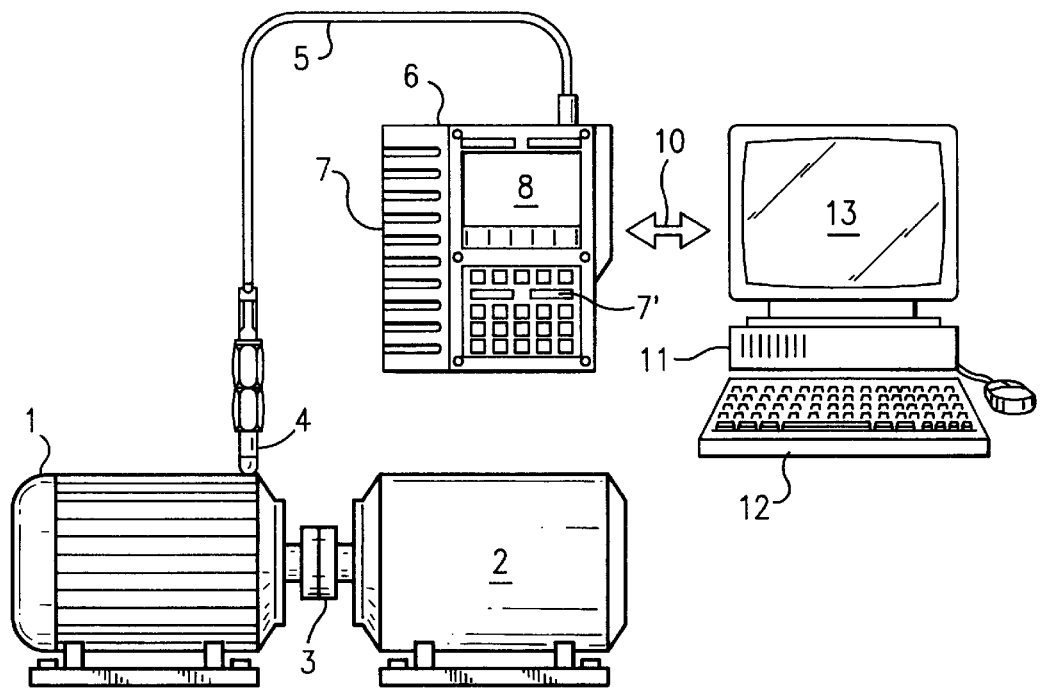
FIG. 2a shows an apparatus arrangement as is used for the method in accordance with the present invention utilizing a data gatherer.
Figure 2B:
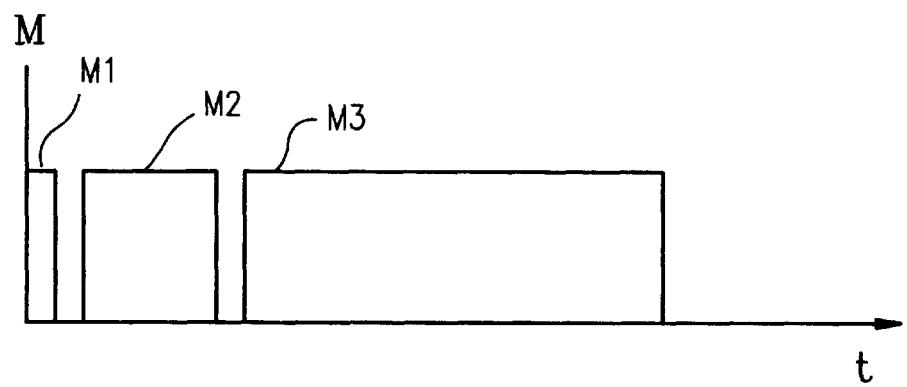
FIG. 2b is a symbolic depiction of a time sequence for determining measurement values.
Figure 2C:
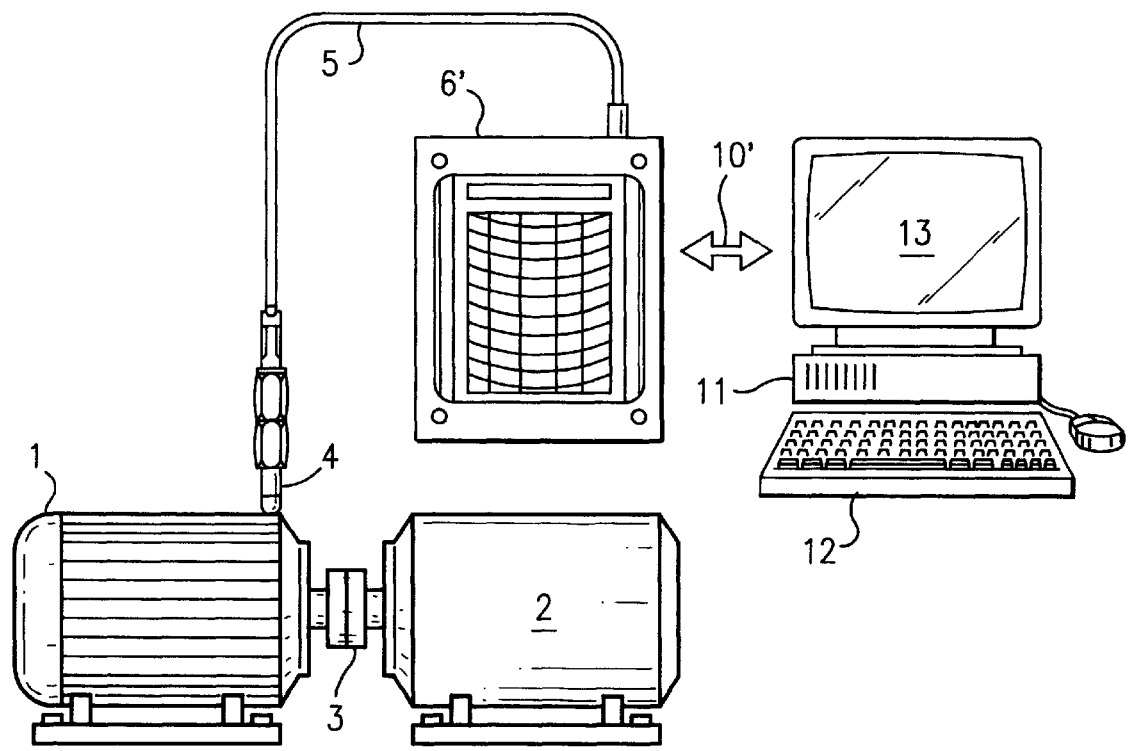
FIG. 2c shows a modified arrangement of an apparatus for use with the method of the present invention having a permanently installed monitoring device.

FIG. 2a shows an apparatus arrangement is are preferred according to the method of this invention. A sensor 4, for example, an acceleration sensor, is fitted to a machine 1 to be monitored, for example, a motor, in order to measure the machine vibration state. At least some parts of the structure-borne sound to be determined can also be caused by a further assembly 2 running at the same time, such as a pump, compressor or the like, and can be transmitted via a coupling 3. The electrical signals produced by the sensor 4 thus form an image of the structure-borne sound determined at a respective measurement point and are passed via the connecting cable 5 to the data gatherer 6. This is typically a portable device having, for example, a first control panel 7 and a second control panel 7' with keyboards, as well as a visual display unit 8, and advantageously, at least one data output (not shown). The data gatherer 6 can be connected directly, or possibly indirectly, via the data output to a data evaluation station 11, so that it is possible to transfer data from the memory in the data gatherer to the evaluation station 11, or back from it. The connecting means (by cable or without wires) are in this case symbolized by the arrow with the reference number 10. The data evaluation station 11 is typically a commercially available personal computer with a keyboard 12 and a screen 13 as well as an associated operating system and further evaluation software. Using suitable communications software and further application-specific evaluation software, the data stored on data gatherer 6 can be transferred into the data evaluation station 11 and evaluated, displayed and finally stored as defined by the operator. Alternatively, and possibly in addition as well, a permanently installed monitoring device 6' can also be provided for the portable data gatherer 6, and this monitoring device 6' can carry out functions comparable to those of the data gatherers (possibly on an automated basis). It can likewise communicate with the data evaluation station 11 by means of appropriate connecting means or data transmission paths without wires, both symbolized by the arrow with the reference number 10' (FIG. 2c).

The arrangement shown in FIG. 2a is able to carry out structure-borne sound measurements, both according to the prior art and according to the invention. The procedure according to the invention is illustrated in FIG. 2b, which shows the time sequence for a measurement at a single measurement point. The abscissa t shows the time, while the ordinate (which is marked M) shows whether individual measurement signals are or are not detected and recorded.

The data gatherer 6 carries out a measurement M1 in a first, relatively short time interval. For this measurement, the acceleration signals emitted by the sensor 4 are fed, at a first sampling frequency, to a low-pass filter, such as an anti-alias filter, contained in the data gatherer. The said first sampling frequency is preset, or can be preset, to a relatively high value. The low-pass-filtered acceleration signals are then converted and stored at a relatively high sampling rate (for example, 100 kHz), until about 1000 to 4000 samples are stored in the data gatherer 6. An analog/digital converter (ADC) with a typical resolution of 12 to 16 bits is expediently provided for conversion.

The measurement M1 is followed by a measurement M2. Its sequence is similar to that of the first measurement. However, a different, specifically lower, sampling frequency is used, that is to say the sampling rate is lower. The sampling rate is preferably reduced by a factor of approximately 10 and is thus, for example, now only about 10 kHz. The number of samples is comparatively large. Owing to the lower sampling rate, the measurement M2 lasts, however, for a correspondingly longer time, for example, about 10 times longer than the measurement M1, in order to produce the same number of lines.

The second measurement M2 is followed by the measurement M3. This sequence is also similar to that of the first and second measurements. However, a low-pass filter having an even lower cut-off frequency is used. In addition, the sampling rate is also reduced here and is now only about 1000 Hz, that is to say it is less than for the measurement 2 by a preferred factor of approximately 10. The number of samples is once again of comparable magnitude to that of the case of measurements M1 and M2. Measurement M3 accordingly once again lasts for a longer time than measurement M2, specifically approximately 10 times as long as for M2, depending on the intended sampling rate.

The multiple measurement and detection of structure-borne sound in different frequency bands result, in contrast to conventional vibration and noise measurements on machines, in the major economic advantage that a spectral representation with optimum resolution in some areas and particularly fine resolution in some places can be calculated for each of the measurements whereas, in contrast, in the case of conventional measurements, the resolution in some areas was either not sufficiently fine or was achievable only with a considerable amount of memory. The important factor is that multiple measurement is carried out at different sampling rates. The sequence in which the sampling rates, and at the same time, the maximum sampling frequencies are changed over is, however, as required. The advantage of the lower memory space requirement in comparison to conventional methods comes to bear in particular, however, when such measurement sequences are carried out at the same measurement point, regularly, using a first measurement sequence (with a plurality of sampling rates), so that statistical values and historical changes can also be determined and displayed in a subsequent evaluation phase.

According to the invention, a further reduction in the required memory space in the signal diagnostic device is achieved in that only those signals are detected whose spectral components overall, or in places, exceed a preset, lower intensity limit. Spectral components whose levels are not sufficiently high are stored in an abbreviated form, using a specific coding.

Additionally, with the invention, detected structure-borne sound signals can also be investigated for frequency bands of interest with significant frequency components by means of an advance analysis, which is carried out by means of a signal diagnostic device 6. Depending on the result of such advance analysis, the setting parameters (sampling rate, cut-off frequency of the upstream low-pass filter) for the measurements M1, M2, M3 (and possibly further measurements) described above are defined automatically on the basis of a measurement setting subroutine, and the sampling frequencies are accordingly set automatically, without any control effort.

The measurement setting subroutine can in this case, if necessary, make use of information which is defined by identification coding of individual measurement points. This means that, in the course of one measurement cycle (lasting, for example, for several hours), structure-borne sound measurements are carried out at several hundred measurement points, the definition of the said parameters depending, inter alia, on the measurement point at which a measurement is currently being carried out.

After the completion of a measurement cycle, the data are transmitted via the connecting or data transmission means (reference number 10) to the data evaluation station 11, in which case there is virtually no limit to the length of the connecting path between the signal diagnostic device and data evaluation station when using modems, radio telephones or similar telecommunications devices.

In a further step according to the method of the invention, the data evaluation station 11 then uses the large number of data sets transmitted to it to determine individual spectrograms and overviews of statistics, and outputs them via a screen or via a printer.

Figure 3:
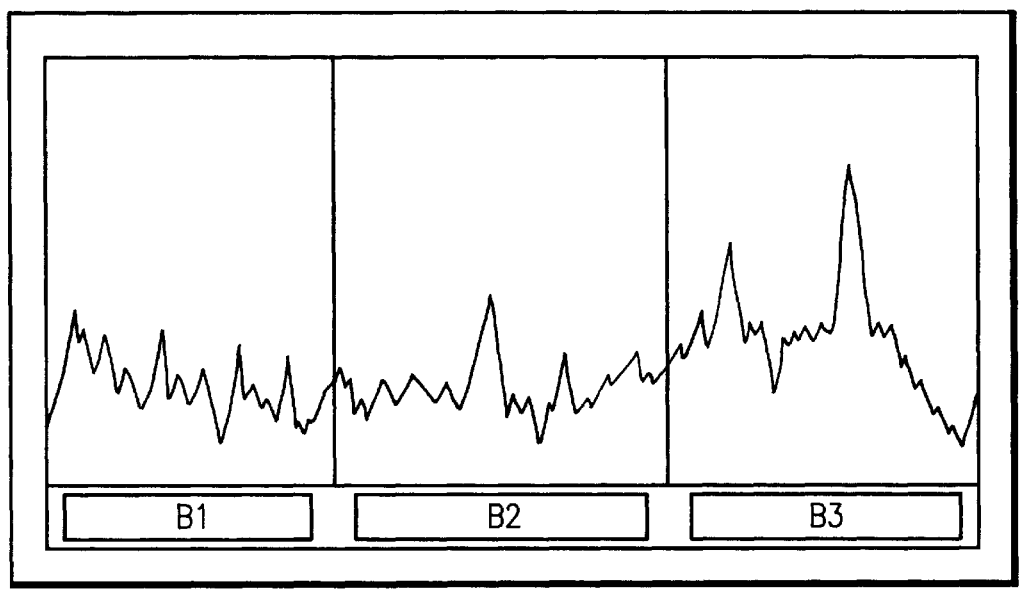
FIG. 3 shows a combined representation of individual structure-borne sound spectra.

A preferred display form according to the invention on the visual display unit of a data gatherer or analyzer is shown in FIG. 3, in which, for example, three spectral bands B1, B2 and B3 are arranged and displayed horizontally alongside one another. These spectral bands are associated with the signals which have been detected at different sampling rates and have been designated, in the above text, as M1, M2, M3, by way of example. According to the invention, it is preferred for the spectral bands B1 to B3 (and possibly other bands) to reflect only those information items which are not already contained in a display which belongs to another spectral band which is likewise shown. The important factor according to the invention is the constant absolute narrow-band bandwidth, that is to say the linear scale, within the individual bands, since otherwise those harmonics of fundamentals (or their sidebands) which occur frequently and can be identified will be displayed in a corrupted form. This considerably simplifies the visual interpretation of the displayed spectra in B1, B2 and B3 since, for example, sidebands which belong to a spectral line can be identified considerably more easily than if a logarithmic abscissa scale were used. In a further refinement of the invention, the spectra represented in B1, B2 and B3 can also be separated from one another by relatively broad frequency bands. In another refinement of the invention, the respective upper and lower frequency limits which are associated with a display of the spectra in B1, B2 and B3 can be varied or set by the operator on the data evaluation station 11 or on the analyzer or data gatherer.

Figure 4:
FIG. 4 shows a summary illustration of a differentially resolved structure-borne sound spectrum according to the prior art.

Overall, the described procedure of the invention, in which data detection is limited to predetermined, permanently set or automatically defined frequency bands, requires much less memory space in a special vibration measurement device 6 than if a conventional display of a plurality of spectrograms were desired, with high frequency resolution or a plurality of spectrograms with different limit frequencies. Displaying the spectrograms with a very large number of lines according to the prior art (FIG. 4) is, furthermore, operator-friendly only if a high-resolution, and thus expensive, screen 13 is used. This disadvantage is likewise avoided by the present invention.

The advantages of the method of the invention over the previous methods of detecting and displaying an overall spectrum are that the frequency resolution of the individual sections required for interpretation by a user is highly advantageous. In addition, the use of the method of the invention considerably shortens the time required for a measurement, particularly when a measurement setting has to be carried out as is the case, in particular, for long-lasting or cyclic measurement. Moreover, good correlation of the individual sections is evident, if required, thus allowing correlation of the effect causes during interpretation, and furthermore, the clear display and easy handling and subsequent processing of only a single, consolidated set of measurement data result in additional advantages.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A method for gathering vibration data representing a measured vibration from a vibration sensor on a machine, said method comprising the steps of:
   receiving a first number of vibration signals in a data gatherer from said vibration sensor, said first number of vibration signals being sampled at a first sampling frequency, wherein said first sampling frequency is determined based upon a desired resolution of signal components in a first frequency band;
   receiving a second number of vibration signals in a data gatherer from said vibration sensor, said second number of vibration signals being sampled at a second sampling frequency, wherein said second sampling frequency is determined based upon a desired resolution of signal components in a second frequency band, said second sampling frequency being different from said first sampling frequency;
   processing said first number of vibration signals and said second number of vibration signals using said data gatherer;
   storing said first number of vibration signals and said second number of vibration signals in said data gatherer;
   subjecting said first number of vibration signals and said second number of vibration signals to frequency analysis to form corresponding first and second frequency spectra; and
   combining said first and second frequency spectra to form an overall frequency spectrum.

2. The method of claim 1, wherein said first sampling frequency and said second sampling frequency are related.

3. The method of claim 2, further comprising the steps of:
   prior to said first receiving step, conducting an advance analysis to determine frequency bands of interest and basing said first and second sampling frequencies upon those frequency bands of interest.

4. The method of claim 3, wherein said advance analysis comprises determining whether a signal component from said vibration sensor has a signal intensity that exceeds a predetermined threshold value.

5. The method of claim 2, wherein said first and second sampling frequencies are related such that the frequency bands are staggered based upon size and such that individual spectra can be superimposed, stored, transmitted and displayed together as an overall spectral combination.

6. The method of claim 1, further comprising storing said frequency spectrum in a single data set.

7. The method of claim 1, wherein subjecting step comprises performing a discrete fourier transformation with a constant absolute narrowband bandwidth in which results of such a transformation are ordered based upon individual frequencies and are reproduced based upon one of magnitude, phase and complex-value results.

8. The method of claim 1, further comprising:
   producing a frequency representation of said overall frequency spectrum; and displaying said frequency representation.

9. The method of claim 8, wherein said displaying of said frequency representation comprises displaying said frequency representation in a rectangular coordinate system, wherein the abscissa of said system is visually sectioned to distinguish said first frequency spectrum from said second frequency spectrum.

10. The method of claim 9, wherein said frequency representation display sections each have an identical scale and different scale end values and different absolute frequency resolutions.

11. The method of claim 8, wherein said step of producing a frequency representation omits overlapping information from said first and second frequency spectra.

12. The method of claim 8, wherein said displaying step is in response to a single display command.

13. The method of claim 12, wherein said displaying step is based upon predefined settings contained in said display command.

14. The method of claim 1, wherein said receiving steps are in response to a receipt of a single measurement command.

15. The method of claim 14, wherein said single measurement command includes an upper cut-off frequency and resolution for each of said first and second sampling frequencies.

16. The method of claim 15, wherein said single measurement command is received via a graphical user interface that includes one of a keyboard and a cursor.

17. The method of claim 15, further comprising the step of receiving a third number of vibration signals in a data gatherer from said vibration sensor, said third number of vibration signals being sampled at a third sampling frequency, wherein said third sampling frequency is determined based upon a desired resolution of signal components in a third frequency band, said third sampling frequency being different from said first and second sampling frequencies, wherein said upper cutoff frequency for said first, second and third sampling frequencies are in a 1:10:100 ratio.

18. The method of claim 17, wherein the upper cut-off frequencies for said corresponding first, second and third sampling frequencies are 0 to 400 hertz, 400 to 4000 hertz and 4000 hertz to 40,000 hertz, respectively.

19. The method of claim 1, further comprising the step of determining the sequence of receiving said first and second number of vibration signals based upon an predetermined pattern.

20. The method of claim 19, wherein said predetermined pattern is based upon one of a sequence and probability distribution of parts of the frequency bands.

21. The method of claim 20, further comprising the steps of:
repeating said receiving steps;
calculating individual fourier-transformed spectra; and
combining said individual fourier-transformed spectra to form an average spectrum.

22. The method of claim 1, further comprising the steps of repeating said receiving steps for each of a plurality of vibration sensors on said machine.

23. An apparatus for determining and displaying spectra for measured vibration of a machine, wherein said vibration is measured using a vibration sensor, said apparatus comprising:
means for receiving a first number of vibration signals from said vibration sensor, said first number of vibration signals being sampled at a first sampling frequency, wherein said first sampling frequency is determined based upon a desired resolution of signal components in a first frequency band;
means for receiving a second number of vibration signals from said vibration sensor, said second number of vibration signals being sampled at a second sampling frequency, wherein said second sampling frequency is determined based upon a desired resolution of signal components in a second frequency band, said second sampling frequency being different from said first sampling frequency;
means for processing said first number of vibration signals and said second number of vibration signals;
storage for said first number of vibration signals and said second number of vibration signals;
means for subjecting said first number of vibration signals and said second number of vibration signals to frequency analysis to form corresponding first and second frequency spectra; and
means for combining said first and second frequency spectra to form an overall frequency spectrum.

24. The apparatus of claim 23, wherein said first sampling frequency and said second sampling frequency are related.

25. The apparatus of claim 23, further comprising:
means for producing a frequency representation of said overall frequency spectrum; and a display for displaying said frequency representation.

26. The apparatus of claim 25, wherein said display displays said frequency representation in a rectangular coordinate system and wherein the abscissa of said system is visually sectioned to distinguish said first frequency spectrum from said second frequency spectrum.

27. The apparatus of claim 26, wherein said means for producing a frequency representation omits overlapping information from said first and second frequency spectra.

28. The apparatus of claim 23, further comprising means for automatic identification of frequency bands having a predefined distribution of signal intensities.

29. The apparatus of claim 28, further comprising means for detecting measurements allocatable to said identified frequency bands having a predefined distribution of signal intensities for setting a cut-off frequency of an anti-alias filter and for setting a sampling rate of an A/D converter.

30. The apparatus of claim 23, wherein said apparatus is one of a portable data gatherer, a signal analyzer and a permanently installed continuous monitor.

* * * * *